US005901448A

United States Patent [19]
Lingerfelt

[11] Patent Number: 5,901,448
[45] Date of Patent: May 11, 1999

[54] STRING TRIMMER HEAD

[76] Inventor: Larry G. Lingerfelt, 99 Ruby Rd., Dahlonega, Ga. 30533

[21] Appl. No.: 08/920,684

[22] Filed: Aug. 29, 1997

[51] Int. Cl.[6] ............................. A01D 34/73; A01D 55/00
[52] U.S. Cl. ................................. 30/276; 30/347; 56/295
[58] Field of Search ....................... 30/276, 347; 56/12.7, 56/295

[56] References Cited

U.S. PATENT DOCUMENTS

| | | | |
|---|---|---|---|
| 4,062,114 | 12/1977 | Luick | 30/276 |
| 4,905,465 | 3/1990 | Jones et al. | 56/295 |
| 5,048,278 | 9/1991 | Jones et al. | 56/295 |
| 5,197,264 | 3/1993 | Lacey | 56/12.1 |
| 5,313,770 | 5/1994 | Smothers | 56/12.7 |
| 5,398,416 | 3/1995 | Mackey | 30/347 |
| 5,615,543 | 4/1997 | Caffey et al. | 56/295 |
| 5,713,191 | 2/1998 | Welton | 56/12.7 |

*Primary Examiner*—Hwei-Siu Payer
*Attorney, Agent, or Firm*—Kenneth S. Watkins, Jr.

[57] ABSTRACT

A string cutter head for weed trimmers comprises a solid seamless hub having an upper disk and a lower disk. The lower disk comprises at least two pairs of vertically drilled holes for installation of a monofilament cutting string. The upper disk acts as a spacer from the trimmer housing to allow installation and removal of cutting string without removal of the cutting head from the weed trimmer. Several holes of different diameters may be used for different diameter strings. The hub comprises a threaded connection for attachment to the shaft end of the trimmer. In the preferred embodiment, the hub is machined from aluminum alloy.

8 Claims, 2 Drawing Sheets

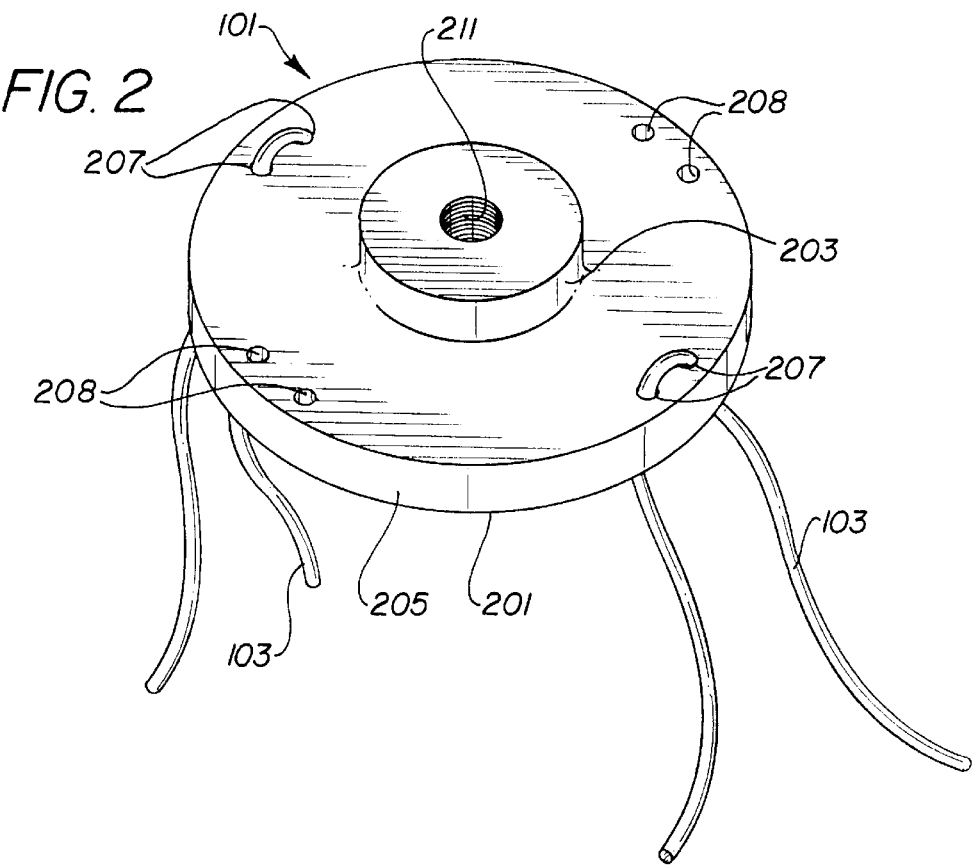
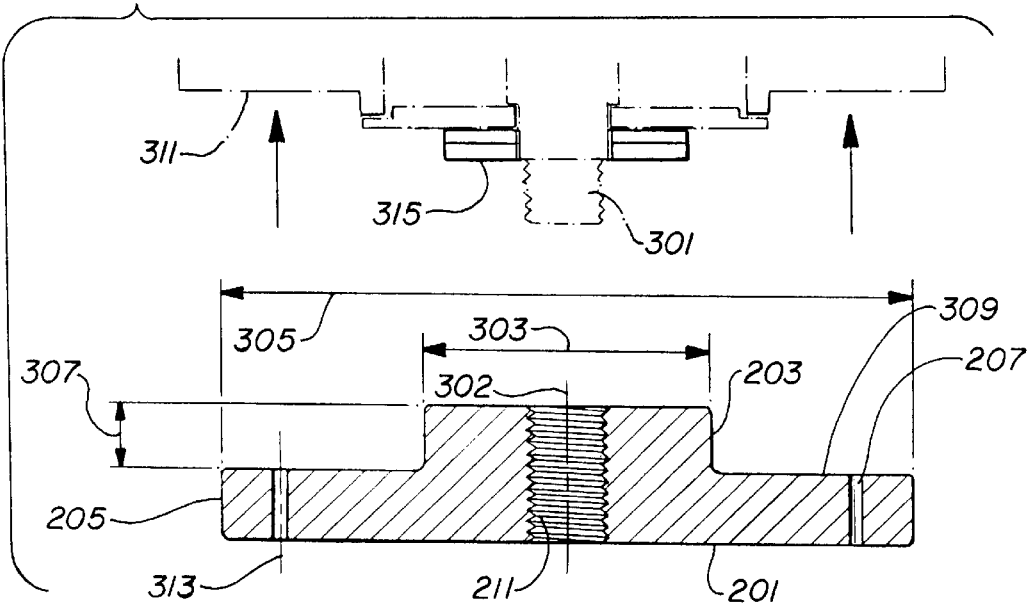

STRING TRIMMER HEAD

BACKGROUND OF THE INVENTION

The present invention relates to weed trimmers and, more particularly, to weed trimmer cutting heads.

Weed trimmers have gained popularity as a convenient device for cutting grass, weeds, and brush, especially in difficult access areas around home, businesses, and farms. A number of cutting heads for these devices have been disclosed to meet the needs of users. An example of such a device is disclosed in U.S. Pat. No. 5,640,836 by the applicant. The blade assembly for weed trimmers disclosed in this patent comprises pivoting steel blades for cutting heavy weeds, vines and underbrush as well as grass and lighter growth.

In many residential areas, string type weed trimmer heads utilizing a monofilament plastic string are popular due to the fact that the string cutting elements are less likely to cause damage to trees, shrubs, and fences if the cutting head is brought too near the trimmed object. These devices are often simpler and less costly than blade units.

One of the major disadvantages of the string type cutting heads is that the string is easily cut or damaged, especially if hard objects are inadvertently encountered. In these cases, the string must be frequently replaced, taking considerable time. In an effort to address this problem, a number of cutting heads have been introduced on the market which contain a spool of string. A number of methods are used to manually, or in some cases automatically, extend additional string when the old string becomes cut or damaged.

Theses units, while partially successful in addressing the problem of string replacement, have added bulk and weight, making use of the trimmer more difficult. Many smaller weed trimmers do not have the power or ruggedness to utilize these units. In many cases, these units fail to function as intended due to poor design, inadequate maintenance, or improper use. Changing string types or diameters is difficult and time consuming. Inventories of different string types is expensive due to the quantities of string used in the spools. These devices also are expensive to purchase and maintain.

So called "cut length" string trimmers, on the other hand, are simple, light and reliable to use. However, many require too much time for string replacement, especially when the head must be removed from the trimmer to replace the string.

OBJECTS AND SUMMARY OF THE INVENTION

Therefore an object of the present invention is to provide a "cut length" string trimmer head which allows quick and easy replacement of the string while the cutter head is mounted on the trimmer.

A further object of the present invention is to provide a string cutter head which is simple, durable and requires little or no maintenance.

A further object of the present invention is to provide a string cutter head which may be used with almost any weed trimmer, including small, low-powered units.

A further object of the present invention is to provide a string cutter head which the string type or size can be easily changed for different cutting uses.

A further object of the present invention is to provide a string cutter head which several types of string may be used simultaneously.

Yet a further object of the present invention is to provide a string cutter head which is inexpensive to purchase and maintain.

The cutter head of the present invention comprises a hub having an upper disk and a larger diameter lower disk. At least two pairs of holes retain cut lengths of string in the lower disk. The pairs of holes are spaced around the periphery of the lower disk with the axis of the holes generally parallel to the rotational axis of the hub. A threaded connection in the center of the hub is coaxial with the rotational axis and allows connection to the drive shaft of the weed trimmer. The upper disk forms a spacer for the lower disk to allow easy installation and removal of a cut length of string from the hole pairs while the cutter head is mounted to the trimmer.

In the preferred embodiment, the hub is solid and seamless to improve ruggedness and reduce crevices which might become entangled with weeds or vines. The hub may be machined from solid aluminum alloy. Different diameter holes may be provided to allow use of different string diameters while maintaining optimum retention of the string in the hub.

BRIEF DESCRIPTION OF THE DRAWINGS

These and other features, aspects and advantages of the present invention will become better understood with regard to the following description, appended claims and accompanying drawings where:

FIG. 2 is a perspective drawing of the string cutter head showing the upper disk, lower disk, and cutter string installed in the cutter string holes; and FIG. 3 is a cross section view of the string cutter head.

DESCRIPTION OF THE PREFERRED EMBODIMENTS

Figure 1:
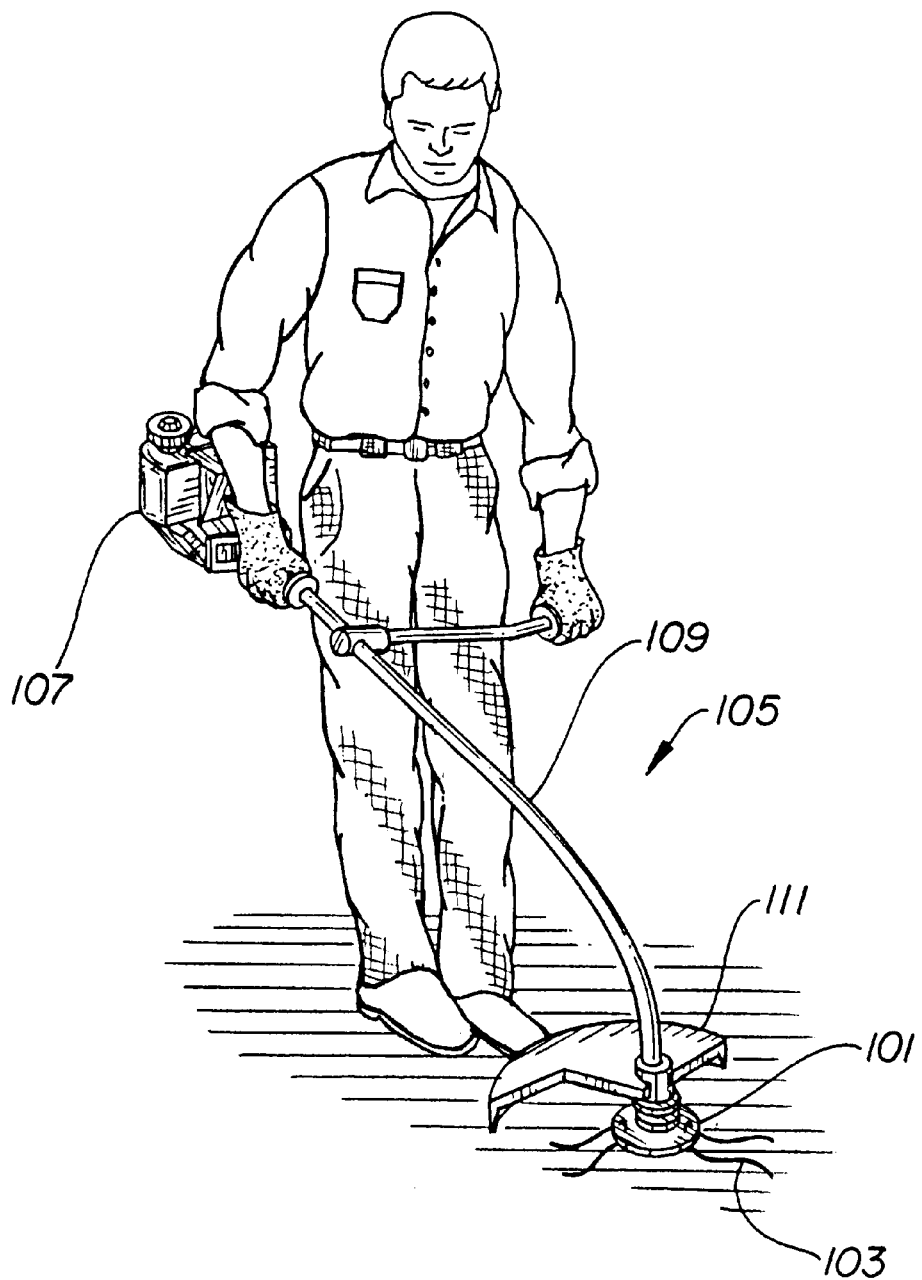
FIG. 1 is a perspective drawing of a cutter head of the present invention installed on a weed trimmer.

The following is a description of the preferred embodiments of a string cutter head for weed trimmers which allows quick string change.

FIG. 1 is a perspective drawing of the string cutter head 101 with cutting strings 103 installed on a typical weed trimmer 105. Weed trimmer 105 may be a gas or electric powered unit with cutter head 101 connected to motor 107 by shaft 109. Guard 111 blocks cut debris from the operator.

FIG. 2 is a perspective drawing of string cutter head 101. Cutter head hub 201 comprises upper disk portion or disk 203 and lower disk portion or disk 205. Lower disk 205 comprises two pairs of string holes 207 through which cutting string 103 is inserted.

Shaft connector 211, in hub 201 center, provides an attachment means for trimmer shaft end (301 of FIG. 3).

FIG. 3 is a cross section of hub 201 showing upper disk 203 and lower disk 205. Upper disk 203 and lower disk 205 are coaxial and comprise center axis 302. Center axis 302 is the axis of rotation of hub 201. The outer diameter 303 of upper disk 203 is less than the outer diameter 305 of lower disk 205. String holes 207 are spaced radially in lower disk 205 between outer diameter 303 of upper disk 203 and outer diameter 305 of lower disk 205. Upper disk 203 extends uniform thickness 307 above top surface 309 of lower disk 205. The radial position of holes 207, along with the vertical clearance from top surface 309 to trimmer housing 311 provided by upper disk thickness 307, allows installation and removal of cutting string 103 without removal of hub 201 from shaft end 301.

In the preferred embodiment, hub 201 is machined from solid aluminum alloy. In other embodiments, hub 201 is fabricated, machined or cast from metal, plastic or composite materials. Cutter string holes 207 are drilled or punched in outer disk 205 with longitudinal centerlines 313 parallel to rotational axis 302. Hole 207 axis orientation allows easy installation and removal of string 103 when the hub is installed on the weed trimmer. In other embodiments, string holes 207 may be tilted up to 30 degrees from vertical without significant effect in string installation and removal. In the preferred embodiment, shaft connector 211 is a threaded connector formed by machining female threads in a hole drilled at rotational centerline 302. In other embodiments, shaft connector 211 may be a threaded, splined, or keyed bushing (not shown) making an interference fit in a hole about the hub centerline. Shims 315 may be used with string cutter head 101 for weed trimmers having splined shafts or recessed drive bushings.

Outer diameter 305 of lower disk 205 is chosen to be large enough to provide adequate clearance from trimmer housing 311 to improve string installation and removal. Outer diameter 305 should be small enough to prevent excessive weight and rotational inertia. Outer diameter 305 is chosen to be 2.0–6.0 inches. In the preferred embodiments, the diameter of lower disk 205 is 2.5–3.5 inches. Outer diameter 303 of upper disk 203 must be large enough to provide adequate support on the shaft drive bushing and small enough for adequate clearance for string installation and removal. Outer diameter 303 is chosen to be 1.0 to 3.0 inches. In the preferred embodiment, outer diameter 303 is 1.25 to 2.75 inches. Thickness 307 of upper disk 203 is chosen to provide adequate clearance for string installation and removal. In the preferred embodiments, thickness 307 is greater than 0.25 inches.

In the preferred embodiments, cutting string 103 is a mono-filament plastic string 0.1 to 0.2 inches in diameter. In the more preferred embodiment, cutting string 103 is 0.130 to 0.160 inches in diameter. The length of cutting string 103 is 8–14 inches. In the preferred embodiments, string 103 length is 12 inches. In other embodiments, cutting string 103 is plastic or metal multi-filament string.

Hub 201 of string cutter head 101 is installed on shaft end 301 of the trimmer. An end of cutting string 103 is inserted in each of the pairs of holes 207 from top surface 309 of lower disk 205. Alternatively, one end of cutting string 103 may be inserted into one of the hole 207 pairs from the bottom of the hub, turned and inserted through the second hole from the top surface 309. In the preferred embodiments, the string length measured from each hole is approximately equal to equalize centrifugal force pulling the string from the holes. Hole spacing between adjacent holes of a pair is 2–5 hole diameters in the preferred embodiment.

In other embodiments, lower disk 205 may contain three or more pairs of string holes 207. For example, two additional pairs of cutting string holes 208 of FIG. 2 may be employed. Holes 208 may have a different diameter than holes 207. In this manner, a different diameter cutting string (not shown) may be used in cutter head 101 either with string 103 or in place of string 103. This feature allows holes 207 and 208 to be sized for best retention of the string, yet allow different diameter strings to be used for different cutting jobs. The pairs of string holes should be radially spaced to reduce imbalance of the hub while running.

Accordingly the reader will see that the STRING CUTTER HEAD provides a "cut length" cutter head which allows installation and removal of cutting string without removal of the head from the trimmer. The cutter head provides the following additional advantages:

The cutter head can be used with virtually any trimmer, including small trimmers;

The cutter head is rugged and requires virtually no maintenance;

The device is seamless, reducing possibility of fouling with weeds and vines;

Different size cutting string can be installed quickly; and

The device is low in cost.

Although the description above contains many specifications, these should not be construed as limiting the scope of the invention but as merely providing illustrations of some of the presently preferred embodiments of this invention. For example, the upper and lower disks may be partial disks such as spokes, as long as the effective outer diameter of the upper disk is less than the effective outer diameter of the lower disk. Thus the scope of the invention should be determined by the appended claims and their legal equivalents, rather than by the examples given.

I claim:

1. A string cutter head for a portable weed trimmer, the cutter head comprising:

a solid, seamless hub, the hub comprising an upper disk and a lower disk, the upper disk having a first outer diameter and the lower disk having a second outer diameter, the first outer diameter being less than the second outer diameter, the upper disk being coaxial with, and extending above, the lower disk;

the lower disk comprising at least two pairs of string retaining holes, each of said at least two pairs of string retaining holes comprising a longitudinal axis generally parallel to a rotational axis of the hub and each of said at least two pairs of string retaining holes having a third diameter;

at least two cutting strings, each of said cutting strings having a fourth diameter, the fourth diameter being less than the third diameter;

the upper disk comprising a uniform predetermined thickness and a predetermined diameter so that insertion of cutting strings into said at least two pairs of string retaining holes when the cutter head is attached to the weed trimmer is facilitated;

the hub further comprising a threaded connection in the center of the hub and coaxial with the rotational axis for attachment to the weed trimmer.

2. The string cutter head of claim 1 wherein a first pair of said at least two pairs of string retaining holes has a different diameter than a second pair of said at least two pairs of string retaining holes.

3. The string cutter bead of claim 2 wherein the uniform predetermined thickness is greater than one fourth inch.

4. A string cutter head for a portable weed trimmer, the cutter head comprising:

a solid, seamless hub, the hub comprising an upper disk and a lower disk, the upper disk having a first outer diameter and the lower disk having a second outer diameter, the first outer diameter being less than the second outer diameter, the upper disk being coaxial with, and extending above, the lower disk;

the lower disk comprising at least two pairs of string retaining holes, each of said at least two pairs of string retaining holes comprising a longitudinal axis generally parallel to a rotational axis of the hub;

the upper disk comprising a uniform predetermined thickness and a predetermined diameter so that insertion of cutting strings into said at least two pairs of string retaining holes when the cutter head is attached to the weed trimmer is facilitated;

the hub further comprising a threaded connection in the center of the hub and coaxial with the rotational axis for attachment to a drive shaft of the weed trimmer.

5. The string cutter head of claim 4 wherein at least a first pair of said at least two pairs of string retaining holes has a different diameter than a second pair of said at least two pairs of string retaining holes.

6. The cutter head of claim 4 wherein the hub is made of metal.

7. The cutter head of claim 6 wherein the hub is made of aluminum alloy.

8. The cutter head of claim 4 wherein the uniform predetermined thickness is greater than one fourth inch.

* * * * *